(12) United States Patent
Ochiai et al.

(10) Patent No.: US 6,757,482 B1
(45) Date of Patent: Jun. 29, 2004

(54) METHOD AND DEVICE FOR DYNAMICALLY EDITING RECEIVED BROADCAST DATA

(75) Inventors: Katsuhiro Ochiai, Tokyo (JP); Hiroshi Matoba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,144

(22) Filed: Feb. 26, 1999

(30) Foreign Application Priority Data

Feb. 26, 1998 (JP) .......................................... 10-045131

(51) Int. Cl.⁷ ................................................ H04N 5/91
(52) U.S. Cl. ...................................... 386/83; 725/48
(58) Field of Search ................................ 386/1, 46, 65, 386/83, 95, 96, 124–126, 69–70, 52, 55; 345/723; 360/13; 369/83; 348/906; 725/39, 40, 48, 43

(56) References Cited

U.S. PATENT DOCUMENTS

| | | | | |
|---|---|---|---|---|
| 5,418,622 A | * | 5/1995 | Takeuchi | 386/96 |
| 5,546,191 A | * | 8/1996 | Hibi et al. | 386/83 |
| 6,282,209 B1 | * | 8/2001 | Kataoka et al. | 370/498 |
| 6,334,022 B1 | * | 12/2001 | Ohba et al. | 386/46 |
| 6,357,043 B1 | * | 3/2002 | Ellis et al. | 348/906 |
| 6,400,887 B1 | * | 6/2002 | Takano et al. | 386/52 |
| 6,408,128 B1 | * | 6/2002 | Abecassis | 386/95 |
| 6,412,110 B1 | * | 6/2002 | Schein et al. | 725/39 |

FOREIGN PATENT DOCUMENTS

| | | |
|---|---|---|
| JP | 9-154097 | 6/1997 |
| JP | 9-322111 | 12/1997 |

* cited by examiner

*Primary Examiner*—Thai Tran
*Assistant Examiner*—Christopher Onuaku
(74) *Attorney, Agent, or Firm*—Foley & Lardner LLP

(57) ABSTRACT

A received broadcast data dynamic editing device for dynamically editing received broadcast data comprises a TV tuner for receiving broadcast data of one or more broadcast programs which are broadcasted by broadcast stations, an HDD for storing the received broadcast data, a modem for acquiring a script for editing the broadcast data stored in the HDD, a main memory for temporarily storing the script acquired by the modem, and a CPU for playing back the broadcast data stored in the HDD according to the script and thereby displaying the broadcast data on a video output device in the order that is designated by the script, for example. The script is, for example, data which includes information concerning playback order, a channel, actual broadcast starting time and actual broadcast ending time with respect to each broadcast data to be played back by the CPU. By the received broadcast data dynamic editing device, scenes of broadcast programs once broadcasted can be shown to the viewer not only in order of broadcasting but also in a variety of styles according to intention of the script. For example, program summarization, scene rearrangement, scene selection-rearrangement across two or more broadcast programs, etc. are possible.

38 Claims, 4 Drawing Sheets

PLAYBACK ORDER | CHANNEL | BROADCAST STARTING TIME | BROADCAST ENDING TIME (TIME FRAME)

PLAYBACK ORDER | CHANNEL | PROGRAM ID | SCENE NUMBER (SCENE IDENTIFIER)

METHOD AND DEVICE FOR DYNAMICALLY EDITING RECEIVED BROADCAST DATA

BACKGROUND OF THE INVENTION

The present invention relates to a method and a device for dynamically editing broadcast data (terrestrial or satellite) or cablecast data received by a receiving terminal (TV tuner etc.).

Description of the Prior Art

With increasing demand for broadcast programs or cablecast programs, viewers of nowadays tend to require higher quality of the programs, and broadcast programs are now being edited in a wide variety of forms.

Figure 1:
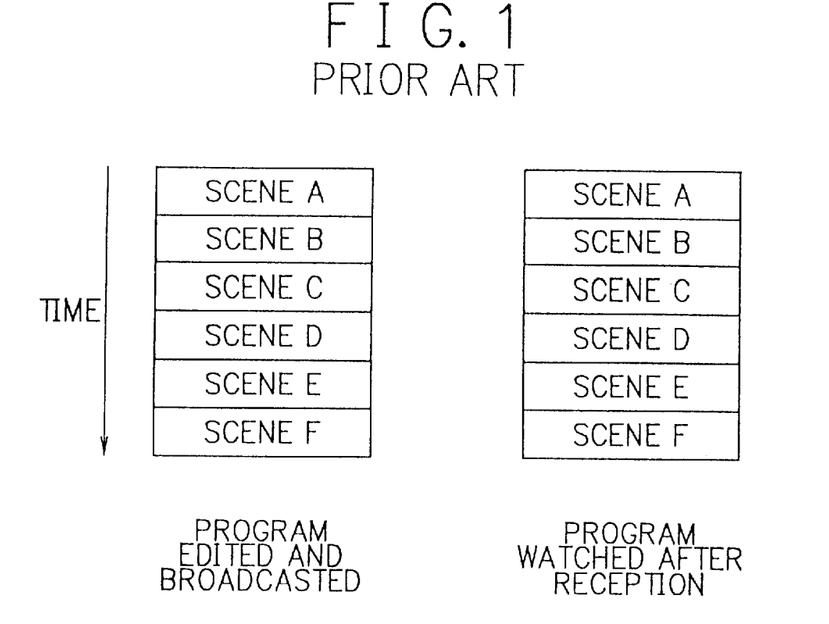
FIG. 1 is a schematic diagram showing relationship between a broadcast program which is edited and broadcasted by a broadcast station and a broadcast program which is watched by viewers after reception.

FIG. 1 is a schematic diagram showing relationship between a broadcast program which is edited and broadcasted by a broadcast station and a broadcast program which is watched by viewers after reception. Referring to FIG. 1, the broadcast program is composed of a plurality of contents (scenes etc.) A, B, . . . , F. Editing of the broadcast program has already been completed when a receiving terminal (a television set etc.) receives the broadcast program, and thus a viewer is required to watch the broadcast program untouched according to the order of the editing before broadcasting. In other words, in conventional editing method for broadcast programs, the order of contents (scenes) of a program watched by the viewer has already been predetermined at the point of broadcasting, and it is very difficult for the viewer to watch the scenes of the program in a different order.

Of course, it is possible for the viewer to watch the broadcast program in a different order by videotaping the broadcast program using a VCR (Videocassette Recorder) and operating the VCR so as to watch the videotaped program differently. However, in such a method using a VCR, the viewer has to execute the order alteration operation at the same time with watching the program, and thus it is difficult for the viewer to playback the scenes of the broadcast program in a suitable order. Further, in order to execute such playback in a suitable order, the viewer is required to grasp the positions of a plurality of scenes in the program, and it is very difficult. Therefore, it is very difficult for the viewer to watch a broadcast program in a suitable content order that is different from the original content order at the point of broadcasting.

SUMMARY OF THE INVENTION

It is therefore the primary object of the present invention to provide a method and a device for dynamically editing received broadcast data, by which broadcast data which has been received by a receiving terminal can be edited by means of a simple method, and a broadcast program can be shown to the viewer in a different content order according to the edited broadcast data.

In accordance with a first aspect of the present invention, there is provided a received broadcast data dynamic editing method for dynamically editing received broadcast data, comprising the steps of a broadcast data storage step, a script acquisition step and a playback step. In the broadcast data storage step, received broadcast data of one or more broadcast programs is stored in a broadcast data storage means. In the script acquisition step, a received broadcast data dynamic editing device acquires a script for editing the broadcast data stored in the broadcast data storage means. In the playback step, the received broadcast data dynamic editing device plays back the broadcast data stored in the broadcast data storage means according to the script which has been acquired in the script acquisition step and thereby the broadcast data is displayed on a display means in the order that is designated by the script.

In accordance with a second aspect of the present invention, in the first aspect, the broadcast data storage means is placed outside the received broadcast data dynamic editing device and connected to a connector of the received broadcast data dynamic editing device.

In accordance with a third aspect of the present invention, in the first aspect, the broadcast data storage means is an HDD (Hard Disk Drive).

In accordance with a fourth aspect of the present invention, in the first aspect, the broadcast data storage means is a DVD-RAM drive.

In accordance with a fifth aspect of the present invention, in the first aspect, the script is data which includes information concerning playback order, a channel, actual broadcast starting time and actual broadcast ending time with respect to each broadcast data to be played back in the playback step.

In accordance with a sixth aspect of the present invention, in the first aspect, the script is data which includes information concerning playback order, a channel and a scene identifier with respect to each broadcast data to be played back in the playback step.

In accordance with a seventh aspect of the present invention, in the first aspect, the received broadcast data dynamic editing device acquires the script by a communication means in the script acquisition step.

In accordance with an eighth aspect of the present invention, in the first aspect, the received: broadcast data dynamic editing device acquires the script via a record medium in the script acquisition step.

In accordance with a ninth aspect of the present invention, in the seventh aspect, the communication means is placed outside the received broadcast data dynamic editing device and connected to a connector of the received broadcast data dynamic editing device.

In accordance with a tenth aspect of the present invention, in the seventh aspect, the communication means is a modem.

In accordance with an eleventh aspect of the present invention, in the first aspect, the broadcast data to be stored in the broadcast data storage means in the broadcast data storage step is received by a broadcast data reception means in a broadcast data reception step.

In accordance with a twelfth aspect of the present invention, in the eleventh aspect, the broadcast data reception means is placed outside the received broadcast data dynamic editing device and connected to a connector of the received broadcast data dynamic editing device.

In accordance with a thirteenth aspect of the present invention, in the eleventh aspect, the broadcast data reception means is a TV tuner.

In accordance with a fourteenth aspect of the present invention, in the first aspect, the broadcast data stored in the broadcast data storage means is MPEG1 format data.

In accordance with a fifteenth aspect of the present invention, in the first aspect, the broadcast data stored in the broadcast data storage means is MPEG2 format data.

In accordance with a sixteenth aspect of the present invention, in the first aspect, the broadcast data stored in the broadcast data storage means is MPEG4 format data.

In accordance with a seventeenth aspect of the present invention, in the first aspect, the broadcast data stored in the broadcast data storage means is Motion-JPEG format data.

In accordance with an eighteenth aspect of the present invention, in the first aspect, the broadcast data stored in the broadcast data storage means includes information concerning time.

In accordance with a nineteenth aspect of the present invention, in the first aspect, the broadcast data stored in the broadcast data storage means includes information concerning a channel, recording starting time and recording ending time with respect to the broadcast data.

In accordance with a twentieth aspect of the present invention, there is provided a received broadcast data dynamic editing device for dynamically editing received broadcast data, comprising a broadcast data storage means, a script acquisition means and a playback means. The broadcast data storage means stores received broadcast data of one or more broadcast programs. The script acquisition means acquires a script for editing the broadcast data stored in the broadcast data storage means. The playback means plays back the broadcast data stored in the broadcast data storage means according to the script which has been acquired by the script acquisition means and thereby displaying the broadcast data on a display means in the order that is designated by the script.

In accordance with a twenty-first aspect of the present invention, in the twentieth aspect, the broadcast data storage means is placed outside the received broadcast data dynamic editing device and connected to a connector of the received broadcast data dynamic editing device.

In accordance with a twenty-second aspect of the present invention, in the twentieth aspect, the broadcast data storage means is an HDD (Hard Disk Drive).

In accordance with a twenty-third aspect of the present invention, in the twentieth aspect, the broadcast data storage means is a DVD-RAM drive.

In accordance with a twenty-fourth aspect of the present invention, in the twentieth aspect, the script is data which includes information concerning playback order, a channel, actual broadcast starting time and actual broadcast ending time with respect to each broadcast data to be played back by the playback means.

In accordance with a twenty-fifth aspect of the present invention, in the twentieth aspect, the script is data which includes information concerning playback order, a channel and a scene identifier with respect to each broadcast data to be played back by the playback means.

In accordance with a twenty-sixth aspect of the present invention, in the twentieth aspect, the script acquisition means includes a communication means for acquiring the script by means of communication.

In accordance with a twenty-seventh aspect of the present invention, in the twentieth aspect, the script acquisition means acquires the script via a record medium.

In accordance with a twenty-eighth aspect of the present invention, in the twenty-sixth aspect, the communication means is placed outside the received broadcast data dynamic editing device and connected to a connector of the received broadcast data dynamic editing device.

In accordance with a twenty-ninth aspect of the present invention, in the twenty-sixth aspect, the communication means is a modem.

In accordance with a thirtieth aspect of the present invention, in the twentieth aspect, the received broadcast data dynamic editing device further comprises a broadcast data reception means for receiving the broadcast data to be stored in the broadcast data storage means.

In accordance with a thirty-first aspect of the present invention, in the thirtieth aspect, the broadcast data reception means is placed outside the received broadcast data dynamic editing device and connected to a connector of the received broadcast data dynamic editing device.

In accordance with a thirty-second aspect of the present invention, in the thirtieth aspect, the broadcast data reception means is a TV tuner.

In accordance with a thirty-third aspect of the present invention, in the twentieth aspect, the broadcast data stored in the broadcast data storage means is MPEG1 format data.

In accordance with a thirty-fourth aspect of the present invention, in the twentieth aspect, the broadcast data stored in the broadcast data storage means is MPEG2 format data.

In accordance with a thirty-fifth aspect of the present invention, in the twentieth aspect; the broadcast data stored in the broadcast data storage means is MPEG4 format data.

In accordance with a thirty-sixth aspect of the present invention, in the twentieth aspect, the broadcast data stored in the broadcast data storage means is Motion-JPEG format data.

In accordance with a thirty-seventh aspect of the present invention, in the twentieth aspect, the broadcast data stored in the broadcast data storage means includes information concerning time.

In accordance with a thirty-eighth aspect of the present invention, in the twentieth aspect, the broadcast data stored in the broadcast data storage means includes information concerning a channel, recording starting time and recording ending time with respect to the broadcast data.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 2:
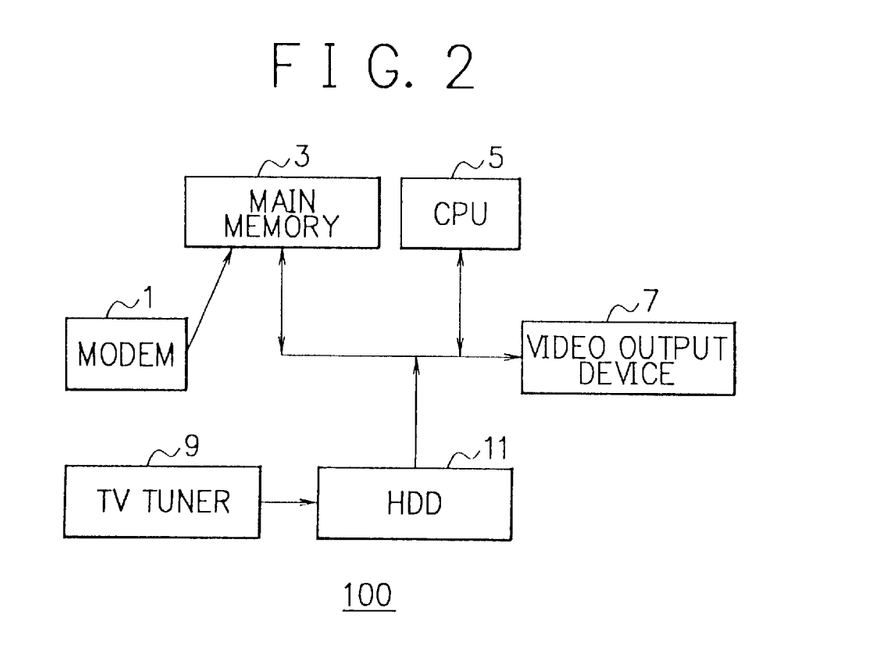
FIG. 2 is a block diagram showing a received broadcast data dynamic editing device according to an embodiment of the present invention.

FIG. 2 is a block diagram showing a received broadcast data dynamic editing device 100 according to an embodiment of the present invention. A received broadcast data dynamic editing method according to the present invention is employed and realized by the received broadcast data dynamic editing device 100 of FIG. 2. Incidentally, in the following, the word "broadcast" means not only broadcast but also wire broadcast (cablecast). Referring to FIG. 2, the received broadcast data dynamic editing device 100 comprises a modem 1 which is connected to an unshown server etc. via a communication line and communicates with the computer, server, etc. in order to receive a script, a main memory 3 for storing the script which has been received by the modem 1, a CPU 5 for controlling components of the operation of the received broadcast data dynamic editing device 100, a video output device 7 for displaying broadcast data which has been edited and outputted according to the instructions of the CPU 5, a TV tuner 9 for receiving broadcast data (video data and audio data) of broadcast programs which are transmitted by unshown broadcast stations, and an HDD (Hard Disk Drive) 11 for storing the broadcast data which has been received by the TV tuner 9. The CPU 5 is connected to each of the components of the received broadcast data dynamic editing device 100 via buses.

The TV tuner 9 of this embodiment represents various types of tuners for receiving signals from various types of broadcast stations: tuners for receiving signals from satellite broadcasting, terrestrial broadcasting (VHF, UHF), wire broadcasting (cable television), etc. The type of the signals received by the TV tuner 9 can be digital provided separately from the video output device 7 and connected to the video output device 7.

In the following, the operation of the received broadcast data dynamic editing device 100 of FIG. 2 will be described.

Broadcast data of a broadcast program transmitted by an unshown broadcast station is received by the TV tuner 9, and the broadcast data is stored in the HDD 11 which is a random access record device. The broadcast data is stored in the HDD 11 in the form of files. For example, in the case of MPEG2, two files: a first file containing an MPEG2 video stream and a second file containing an MPEG2 audio stream are stored in the HDD 11 as the broadcast data. Each file includes information concerning the name of the file (managed by the CPU 5 so as to be unique in the HDD 11), a channel number of the broadcast station that sent the broadcast program (informed by the TV tuner 9 etc.), broadcast (recording) starting time of the broadcast data, and broadcast (recording) ending time of the broadcast data.

The script of the broadcast program is described and prepared by a script writing staff (the supplier of the broadcast program or a third-party script writing company), and stored in the unshown server etc. so as to be able to be acquired by the user of the received broadcast data dynamic editing device 100 via the modem 1 etc. The script stored in the unshown server etc. is acquired by the user via the modem 1 and is temporarily stored in the main memory 3.

Incidentally, there are various methods for supplying the script to the received broadcast data dynamic editing device 100. For example, the script can also be supplied to the received broadcast data dynamic editing device 100 during broadcasting of the program, by means of data broadcasting (a service for supplying the viewer with character data etc. along with the broadcast data) etc. In such signals or analog signals.

In the case of digital broadcasting, The TV tuner 9 receives an MPEG2-TS (Transport Stream) from the broadcast station, and an MPEG2 video stream and an MPEG2 audio stream extracted from the MPEG2-TS are stored in the HDD 11 as the broadcast data, for example.

In the case of analog broadcasting, the TV tuner 9 outputs a video signal, an audio signal-R (right) and an audio signal-L (left). The signals outputted by the TV tuner 9 is converted by a capture device into Motion-JPEG format and the Motion-JPEG data is stored in the HDD 11 as the broadcast data, for example. Incidentally, there are various types of capture devices, and the format employed by the capture devices is not limited to the Motion-JPEG format. For example, the broadcast data converted by the capture device and stored in the HDD 11 can also be MPEG1 format (an MPEG1 video stream and an MPEG1 audio stream), MPEG2 format (an MPEG2 video stream and an MPEG2 audio stream), or MPEG4 format (an MPEG4 video stream and an MPEG4 audio stream).

The HDD 11 can store broadcast data of as long as 10 hours when the broadcast data stored in the HDD 11 is 4 Mbps MPEG2 format data and the HDD 11 is an 18 Gbyte HDD, for example. While the HDD 11 is used in the received broadcast data dynamic editing device 100 in this embodiment, other device such as DVD-RAM drive can also be employed as broadcast data storage means.

The video output device 7 includes a decoding section (including an MPEG2 video decoder and an MPEG2 audio decoder, for example) for decoding the broadcast data read out from the HDD 11, a display section for displaying decoded and processed broadcast data (i.e. scenes) to the viewer, speakers, etc., for example. The display section and the speakers of the video output device 7 can also be cases, the broadcasted script is acquired by an unshown data broadcast decoder and is temporarily stored in the main memory 3.

Or the script can also be supplied to the received broadcast data dynamic editing device 100 via a record medium such as a floppy disk, CD-ROM, etc. In such cases, the floppy disk, CD-ROM, etc. containing the script is distributed to the viewer. The script stored in the record medium is read out by an unshown floppy disk drive, CD-ROM drive, etc. of the received broadcast data dynamic editing device 100 and is temporarily stored in the main memory 3.

Figure 3:
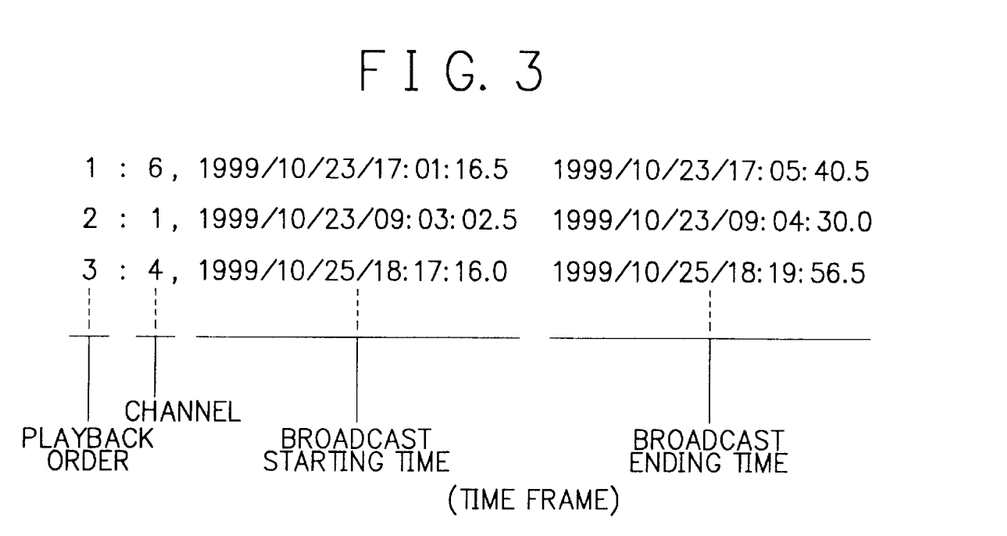
FIG. 3 is a schematic diagram showing an example of a script which is used by the received broadcast data dynamic editing device of FIG. 2.

FIG. 3 is a schematic diagram showing an example of the script for designating the order of playback of the broadcast data of one or more broadcast programs. Referring to FIG. 3, the script contains "playback order" indicating the order of playback, "channel numbers" of channels of the broadcast programs which will be played back, and "time frames" of scenes to be played back. Each time frame includes starting time and ending time of each scene on actual broadcasting, that is, when the scene actually started and ended when the program was broadcasted. In this example, a scene on channel 6, a scene on channel 1 and a scene on channel 4 will be played back successively according to the script.

As mentioned before, the TV tuner 9 represents various types of tuners for receiving signals from satellite broadcasting, terrestrial broadcasting (VHF, UHF), wire broadcasting (cable television), etc. Therefore, the channel number in FIG. 3 represents channels in satellite broadcasting, terrestrial broadcasting (VHF, UHF), wire broadcasting (cable television), etc.

The CPU 5 of the received broadcast data dynamic editing device 100 may use a correspondence table showing the correspondence between the channel numbers which are used in the script of FIG. 3 and the channel numbers which are informed by the TV tuner 9 etc. and included in the files of broadcast data stored in the HDD 11.

The channel number to be included in the files of broadcast data stored in the HDD 11 can also be inputted by the user to the received broadcast data dynamic editing device 100 by operating a remote control unit etc. of the received broadcast data dynamic editing device 100. In such cases, the user uses the channel numbers which are used in the script.

Or, in the case where the CPU 5 of the received broadcast data dynamic editing device 100 controls the TV tuner 9 (i.e. various types of tuners) for recording broadcast programs, the CPU 5 grasps the correspondence between the channel numbers in the script of FIG. 3 and channel numbers used by the TV tuner 9, and the channel numbers in the script are included in the files of the broadcast data stored in the HDD 11. Incidentally, the control of the TV tuner 9 by the CPU 5 of the received broadcast data dynamic editing device 100 can be realized by connecting the received broadcast data dynamic editing device 100 and the TV tuner 9 via an RS-232C cable etc., or by providing the received broadcast data dynamic editing device 100 with an infrared transmission section etc. in order to send control signals to the remote control sensor of the TV tuner 9 in the same way as the remote control of the TV tuner 9.

Incidentally, characters such as "ABC" can also be used instead of the channel numbers in the script of FIG. 3, if a suitable correspondence table between characters and channel numbers is prepared.

Referring again to FIG. 3, the broadcast starting time of the first scene in the script "1999/10/23/17:01:16.5" specifies the year, month, day and time of the broadcast starting time. The time "17:01:16.5" specifies the time with an accuracy of half a second. The broadcast ending time is also described with the accuracy of half a second. The time resolution of the time frames of scenes to be played back can be set adequately depending on performance of the received broadcast data dynamic editing device 100.

Figure 4:
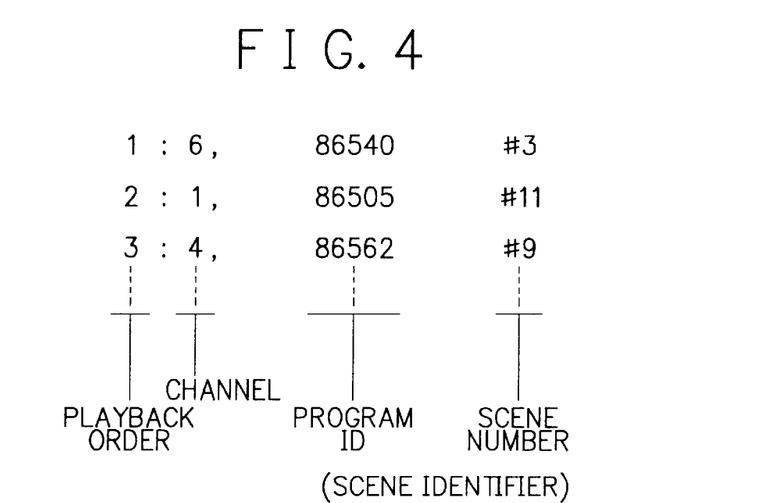
FIG. 4 is a schematic diagram showing another example of a script which is used by the received broadcast data dynamic editing device of FIG. 2.

While the script of FIG. 3 was described with respect to time frames, it is also possible to describe the script with respect to scenes etc. For example, if correspondence table data showing the correspondence between scene numbers (#1, #2, #3, #4, . . . , #30 etc.) of a broadcast program and time:frames of scenes is prepared and distributed by the script writing staff to the received broadcast data dynamic editing device 100, the script can be described with respect to scene numbers as shown in FIG. 4. Referring to FIG. 4, a line of the script corresponding to a scene includes information concerning playback order, a channel and a scene identifier. The scene identifier includes a program identifier and a scene number. A program identifier as shown in FIG. 4 can be supplied from a broadcast station to the received broadcast data dynamic editing device 100 when a broadcast program corresponding to the program identifier is actually broadcasted. For example, in the case of MPEG2 digital broadcasting, the program identifier can be sent to the TV tuner 9 in a MPEG2 program stream during broadcasting of the program. Therefore, by including the program identifier in the broadcast data stored in the HDD 11, playback of broadcast data according to the script of FIG. 4 can be realized.

When the viewer (the user of the received broadcast data dynamic editing device 100) requested playback of a broadcast program according to the script by operating a remote control unit etc. of the received broadcast data dynamic editing device 100, the CPU 5 interprets each line of the script one by one and thereby reads out broadcast data corresponding to each line of the script from the HDD 11.

When broadcast data corresponding to each line of the script of FIG. 3 is read out from the HDD 11, the following three time management methods can be used.

In the case where the broadcast data supplied to the TV tuner 9 is MPEG data (MPEG-TS), information concerning timestamp can preliminarily be included in the broadcast data. Therefore, the timestamps in the broadcast data files stored in the HDD 11 (the MPEG video stream and the MPEG audio stream) are corrected using the information included in the broadcast data file concerning broadcast (recording) starting time of the broadcast data, and the corrected timestamp is used when the broadcast data is read out from the HDD 11 according to the script.

Time management method without using the timestamp information can also be employed. The amount of data in the broadcast data file stored in the HDD 11 is proportional to recording time, that is, elapsed time in recording the broadcast data. Therefore, broadcast data specified by a line of the script can be read out from the broadcast data file in the HDD 11, using the proportional relationship and the information included in the broadcast data file concerning broadcast (recording) starting time of the broadcast data.

It is also possible to let the CPU 5 count the number of bytes of the broadcast data file recorded in the HDD 11 at every second from the start of the recording and generate a corresponding table indicating the correspondence between elapsed time and the number of bytes in the broadcast data file. In this case, broadcast data specified by a line of the script can be read out from the broadcast data file in the HDD 11, using the corresponding table and the information included in the broadcast data file concerning broadcast (recording) starting time of the broadcast data.

The broadcast data read out from the HDD 11 one by one according to the script is displayed by the video output device 7, thereby the broadcast program according to the script is shown to the viewer.

Incidentally, while the received broadcast data dynamic editing device 100 of this embodiment has been described as including all the components shown in FIG. 2, it is also possible to let some components placed outside the received broadcast data dynamic editing device 100 and connected to the received broadcast data dynamic editing device 100.

For example, the modem 1 can be placed outside the received broadcast data dynamic editing device 100. In such cases, the received broadcast data dynamic editing device 100 is provided with a connector to which the modem 1 is connected via an external cable etc. The TV tuner 9 can also be placed outside the received broadcast data dynamic editing device 100. In such cases, the received broadcast data dynamic editing device 100 is provided with a connector to which the TV tuner 9 is connected via an external cable etc. The HDD 11 can also be placed outside the received broadcast data dynamic editing device 100. In such cases, the received broadcast data dynamic editing device 100 is provided with a connector to which the HDD 11 is connected via an external cable etc.

Of course, two or more selected from the modem 1, TV tuner 9 and the HDD 11 can also be placed outside the received broadcast data dynamic editing device 100. The display section and the speakers of the video output device 7 can also be placed separately from the received broadcast data dynamic editing device 100, as mentioned before.

In the following, the received broadcast data dynamic editing device 100 and the received broadcast data dynamic editing method employed by the device 100 will be described more in detail.

Figure 5:
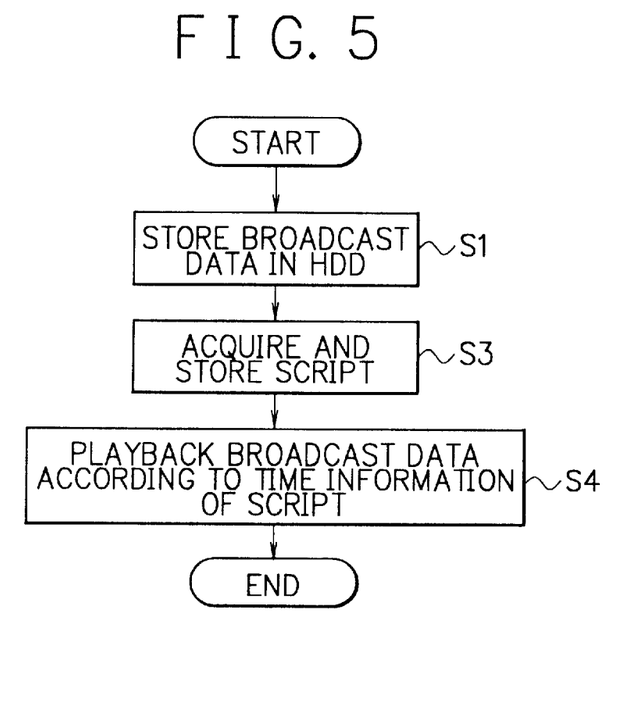
FIG. 5 is a flow chart showing the operation of the received broadcast data dynamic editing device of FIG. 2.

FIG. 5 is a flow chart showing the received broadcast data dynamic editing method and the operation of the received broadcast data dynamic editing device 100 according to the embodiment of the present invention. Referring to FIG. 5, broadcast program editing according to the present invention is executed as follows.

(1) First, broadcast data (video data and audio data) of a broadcast program is stored in the HDD 11 of the received broadcast data dynamic editing device 100 when a broadcast program is broadcasted (step S1).

(2) Before or after the broadcasting, the script writing staff prepares a script with respect to one or more broadcast programs, including playback order, actual broadcast starting time, actual broadcast ending time and a channel number of each scene to be played back, for example (step S2).

(3) Before, after or during the broadcasting, the received broadcast data dynamic editing device 100 acquires the script prepared by the script writing staff via communication lines and the modem 1, via data broadcasting, or via a record medium such as such as a floppy disk, CD-ROM, etc., and the script is temporarily stored in the main memory 3 of the received broadcast data dynamic editing device 100 (step S3).

(4) When the viewer requested playback of the broadcast program by operating a remote control unit etc. of the received broadcast data dynamic editing device 100, the CPU 5 interprets contents of the script one by one and thereby reads out corresponding broadcast data from the HDD 11 one by one. The broadcast data read out from the HDD 11 according to the script is successively displayed by the video output device 7 (step S4).

Incidentally, while explanation has been given on the assumption that the broadcast data corresponding to the script is stored in the received broadcast data dynamic editing device 100 when the program is broadcasted, the received broadcast data dynamic editing device 100 is not necessarily required to store the broadcast data simultaneously with broadcasting. For example, the broadcast data can also be supplied to the received broadcast data dynamic editing device 100 from a third-party company via a communication line and a communication means such as the modem 1 when (or just before) the script is interpreted by the received broadcast data dynamic editing device 100.

Therefore, the received broadcast data dynamic editing device 100 can play back the broadcast data in the order of the script even if the program has not been broadcasted and the broadcast data has not been stored in the HDD 11 yet, by acquiring necessary broadcast data (video data and audio data) via a communication line (from the Internet etc.).

In the following, some examples of broadcast program editing by the received broadcast data dynamic editing device 100 and the received broadcast data dynamic editing method according to the present invention will be described.

Figure 6:
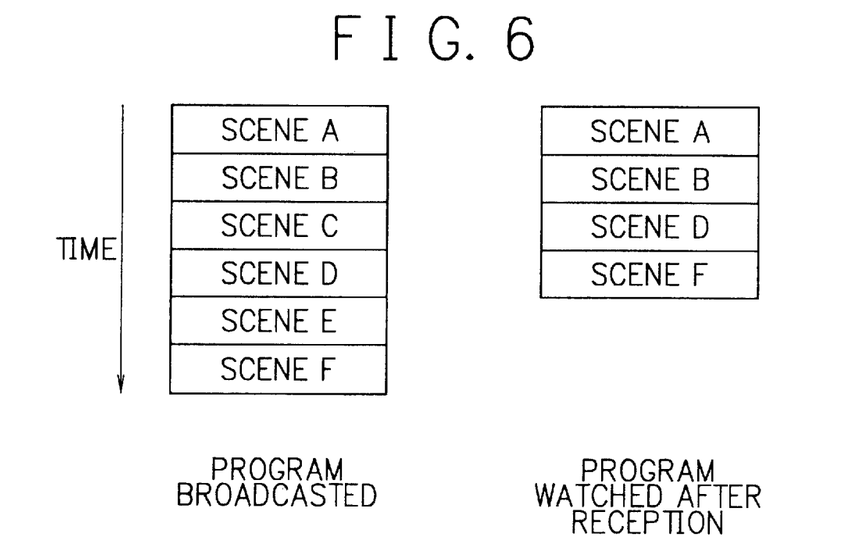
FIG. 6 is a schematic diagram showing an example of a digest (summary) program which is produced by the received broadcast data dynamic editing device of FIG. 2.

FIG. 6 is a schematic diagram showing an example of a digest (summary) program which is produced by the editing method of the present invention. In this case, the script writing staff selects and extracts contents (scenes) from the original broadcast program (on the left-hand side of FIG. 6) and describes the script so as to contain the extracted scenes only. Therefore, the broadcast program watched by the viewers (on the right-hand side of FIG. 6) contains scenes A, B, D and F which has been selected by the script writing staff. Such program summarization; is effective, for example, in order to extract news concerning foreign countries from the whole news program and let the viewers watch the extracted news.

Figure 7:
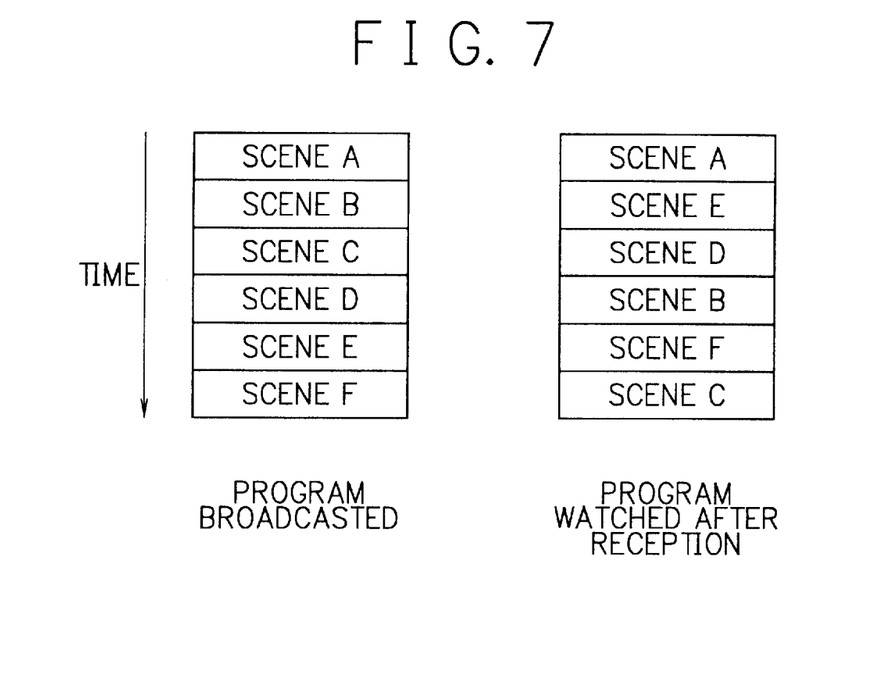
FIG. 7 is a schematic diagram showing an example of a rearranged program which is produced by the received broadcast data dynamic editing device of FIG. 2.

FIG. 7 is a schematic diagram showing an example of a rearranged program which is produced by the editing method of the present invention. In this case, the script writing staff describes the script so that the scenes A~F of the program will be shown to the viewers in a different sequence compared to the original program. The viewers using the script watch the scenes A~F of the broadcast program in a different order: A, E, D, B, F and C. Such scene rearrangement is effective, for example, in order to let the viewers watch news reports in a news program in order of fun etc.

Figure 8:
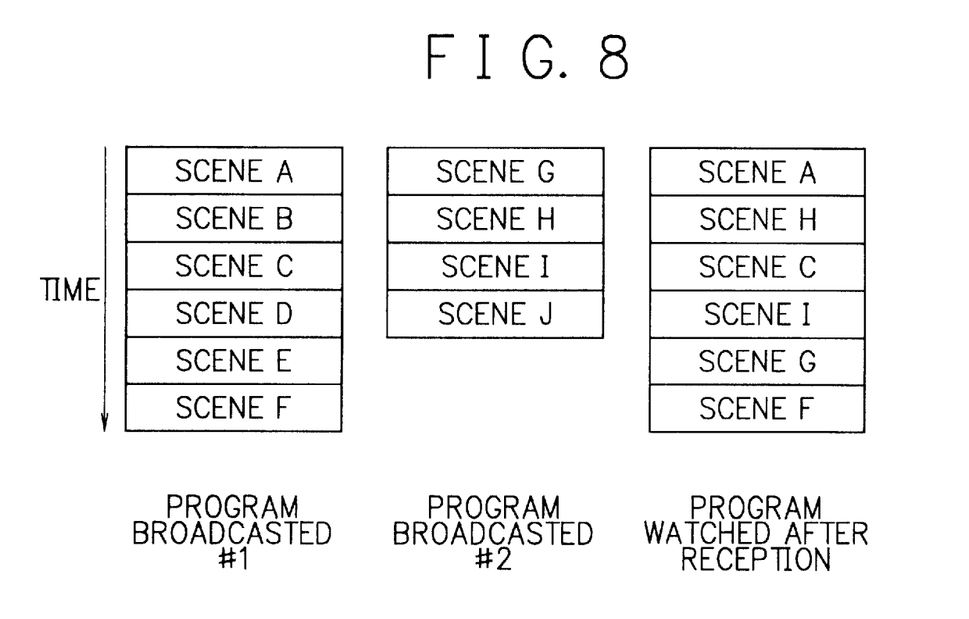
FIG. 8 is a schematic diagram showing an example of a program which is produced by the received broadcast data dynamic editing device of FIG. 2 by selecting and rearranging scenes from two or more broadcast programs.

FIG. 8 is a schematic diagram showing an example of a program which is produced by the editing method of the present invention, by selecting and rearranging scenes from two or more broadcast programs. In this case, the script writing staff selects scenes from two programs, rearranges the selected scenes, and describes the script so that the selected scenes will be shown to the viewers in order of the rearrangement. The viewers using the script watch scenes A, C and F selected from the program #1 and scenes G, H and I selected from the program #2 in a rearranged order: A, H, C, I, G and F. Such scene selection-rearrangement across two or more broadcast programs is effective, for example, in order to let the viewers watch news reports concerning sports transversely out of two or more news programs of different broadcast stations.

As shown in the above three examples, by the dynamic editing method and device of the present invention, the viewers can watch the broadcast programs not only in order of broadcasting but also in a variety of styles according to intention of the script writing staff. The types of programs produced by the dynamic editing method and device of the present invention is not limited to the above three examples from FIG. 6 to FIG. 8. Editing of broadcast programs can be done in a variety of ways by describing the script.

As set forth hereinabove, in the received broadcast data dynamic editing device and the received broadcast data dynamic editing method according to the present invention, broadcast data (video data and audio data) of programs broadcasted from broadcast stations are stored in a random access record medium, and a script for designating the order of playback of the broadcast data is prepared by the script writing staff and supplied to the received broadcast data dynamic editing device 100 or the viewer (the user of the received broadcast data dynamic editing device 100). A variety of scripts can be prepared and supplied to the viewer, and the viewer can select a script from the supplied scripts. The received broadcast data dynamic editing device 100 plays back the broadcast data stored in the random access record medium according to the order of the script selected by the viewer. By the dynamic editing method and device according to the present invention, a broadcast program can be shown to the viewer not only in order of broadcasting but also in a variety of styles according to intention of the script writing staff.

Further, the script can be described so as to select and rearrange scenes from two or more broadcast programs, therefore, selected contents of two or more broadcast programs can be effectively presented to the viewer according to intention of the script writing staff.

In addition, while explanation has been given on the assumption that the script is supplied from the script writing staff (third-party companies etc.), the user of the received broadcast data dynamic editing device 100 can also prepare the script by describing the script using a word processor etc. and storing the script in a record medium such as a floppy disk. Therefore, the user of the received broadcast data dynamic editing device 100 can privately edit one or more broadcast programs into a program according to intention of the user and watch the edited program.

The received broadcast data dynamic editing device 100 can also execute playback of broadcast data according to the script even then the program has not been broadcasted and the broadcast data has not been stored in the HDD 11 (broadcast data storage means) yet, by acquiring necessary broadcast data (video data and audio data) via a communication line (from a server on the Internet etc.). Therefore, the user can watch a wide variety of programs acquired via the communication line according to the scripts.

The script employed in the present invention is not limited to the above examples of FIGS. 3 and 4, and the script can be described in a varieties of styles, as long as the script can designate playback order of broadcast data acquired by the received broadcast data dynamic editing device 100.

While the present invention has been described with reference to the particular illustrative embodiments, it is not to be restricted by those embodiments but only by the appended claims. Incidentally, as mentioned before, the word "broadcast" in the following claims means not only broadcast but also wire broadcast (cablecast). It is to be appreciated that those skilled in the art can change or modify the embodiments without departing from the scope and spirit of the present invention.

What is claimed is:

1. A received broadcast data dynamic editing method for dynamically editing received broadcast data, comprising the steps of:
    a broadcast data storage step in which received broadcast data including one or more broadcast programs, each broadcast program containing video and audio content data and being other than program scheduling information is stored in a broadcast data storage device, each program having a plurality of scenes;
    a script acquisition and editing step in which a received broadcast data dynamic editing device acquires a script and edits the broadcast data stored in the broadcast data storage device utilizing said script, said script indicating directly or indirectly broadcast start times for each of the plurality of scenes, said editing including at least one of (1) changing the order of scenes within the one or more programs and (2) skipping scenes within the one or more programs; and
    a playback step in which the received broadcast data dynamic editing device plays back the broadcast data stored in the broadcast data storage device according to the edited broadcast data based on the script acquisition and editing step and thereby the broadcast data is displayed on a display device in the order that is designated by the edited broadcast data.

2. A received broadcast data dynamic editing method as claimed in claim 1, wherein the broadcast data storage device is placed outside the received broadcast data dynamic editing device and connected to a connector of the received broadcast data dynamic editing device.

3. A received broadcast data dynamic editing method as claimed in claim 1, wherein the broadcast data storage device is an HDD (Hard Disk Drive).

4. A received broadcast data dynamic editing method as claimed in claim 1, wherein the broadcast data storage device is a DVD-RAM drive.

5. A received broadcast data dynamic editing method as claimed in claim 1, wherein the script is data which includes information concerning playback order, a channel, an actual broadcast starting time and an actual broadcast ending time with respect to each broadcast data to be played back in the playback step.

6. A received broadcast data dynamic editing method as claimed in claim 1, wherein the script is data which includes information concerning playback order, a channel and a scene identifier corresponding to a broadcast start time and a broadcast end time with respect to each broadcast data to be played back in the playback step.

7. A received broadcast data dynamic editing method as claimed in claim 1, wherein the received broadcast data dynamic editing device acquires the script by a communication device in the script acquisition and editing step.

8. A received broadcast data dynamic editing method as claimed in claim 7, wherein the communication device is placed outside the received broadcast data dynamic editing device and connected to a connector of the received broadcast data dynamic editing device.

9. A received broadcast data dynamic editing method as claimed in claim 7, wherein the communication device is a modem.

10. A received broadcast data dynamic editing method as claimed in claim 1, wherein the received broadcast data dynamic editing device acquires the script via a record medium in the script acquisition and editing step.

11. A received broadcast data dynamic editing method as claimed in claim 1, wherein the broadcast data to be stored in the broadcast data storage device in the broadcast data storage step is received by a broadcast data reception device in a broadcast data reception step.

12. A received broadcast data dynamic editing method as claimed in claim 11, wherein the broadcast data reception device is placed outside the received broadcast data dynamic editing device and connected to a connector of the received broadcast data dynamic editing device.

13. A received broadcast data dynamic editing method as claimed in claim 11, wherein the broadcast data reception device is a TV tuner.

14. A received broadcast data dynamic editing method as claimed in claim 1, wherein the broadcast data stored in the broadcast data storage device is MPEG1 format data.

15. A received broadcast data dynamic editing method as claimed in claim 1, wherein the broadcast data stored in the broadcast data storage device is MPEG2 format data.

16. A received broadcast data dynamic editing method as claimed in claim 1, wherein the broadcast data stored in the broadcast data storage device is MPEG4 format data.

17. A received broadcast data dynamic editing method as claimed in claim 1, wherein the broadcast data stored in the broadcast data storage device is Motion-JPEG format data.

18. A received broadcast data dynamic editing method as claimed in claim 1, wherein the broadcast data stored in the broadcast data storage device includes information concerning time.

19. A received broadcast data dynamic editing method as claimed in claim 1, wherein the broadcast data stored in the broadcast data storage device includes information concerning a channel, recording starting time and recording ending time with respect to the broadcast data.

20. A received broadcast data dynamic editing device for dynamically editing received broadcast data, comprising:
    a broadcast data storage means for storing received broadcast data of one or more broadcast programs, each broadcast program containing video and audio content data and being other than program scheduling information, each program having a plurality of scenes;

a script acquisition means for acquiring a script for editing the broadcast data stored in the broadcast data storage means, said script indicating directly or indirectly broadcast start times for each of the plurality of scenes;

editing means for editing said broadcast data stored in said broadcast data storage means utilizing said script, said editing including at least one of (1) changing the order of scenes within the one or more programs and (2) skipping scenes within the one or more programs; and a playback means for playing back the broadcast data stored in the broadcast data storage means according to the script which has been acquired by the script acquisition means and thereby displaying the broadcast data on a display means in the order that is designated by the edited script.

21. A received broadcast data dynamic editing device as claimed in claim 20, wherein the broadcast data storage means is placed outside the received broadcast data dynamic editing device and connected to a connector of the received broadcast data dynamic editing device.

22. A received broadcast data dynamic editing device as claimed in claim 20, wherein the broadcast data storage means is an HDD (Hard Disk Drive).

23. A received broadcast data dynamic editing device as claimed in claim 20, wherein the broadcast data storage means is a DVD-RAM drive.

24. A received broadcast data dynamic editing device as claimed in claim 20, wherein the script is data which includes information concerning playback order, a channel, an actual broadcast starting time and an actual broadcast ending time with respect to each broadcast data to be played back by the playback means.

25. A received broadcast data dynamic editing device as claimed in claim 20, wherein the script is data which includes information concerning playback order, a channel and a scene identifier corresponding to a broadcast start time and a broadcast end time with respect to each broadcast data to be played back by the playback means.

26. A received broadcast data dynamic editing device as claimed in claim 20, wherein the script acquisition means includes a communication means for acquiring the script by means of communication.

27. A received broadcast data dynamic editing device as claimed in claim 26, wherein the communication means is placed outside the received broadcast data dynamic editing device and connected to a connector of the received broadcast data dynamic editing device.

28. A received broadcast data dynamic editing device as claimed in claim 26, wherein the communication means is a modem.

29. A received broadcast data dynamic editing device as claimed in claim 20, wherein the script acquisition means acquires the script via a record medium.

30. A received broadcast data dynamic editing device as claimed in claim 20, further comprising a broadcast data reception means for receiving the broadcast data to be stored in the broadcast data storage means.

31. A received broadcast data dynamic editing device as claimed in claim 30, wherein the broadcast data reception means is placed outside the received broadcast data dynamic editing device and connected to a connector of the received broadcast data dynamic editing device.

32. A received broadcast data dynamic editing device as claimed in claim 30, wherein the broadcast data reception means is a TV tuner.

33. A received broadcast data dynamic editing device as claimed in claim 20, wherein the broadcast data stored in the broadcast data storage means is MPEG1 format data.

34. A received broadcast data dynamic editing device as claimed in claim 20, wherein the broadcast data stored in the broadcast data storage means is MPEG2 format data.

35. A received broadcast data dynamic editing device as claimed in claim 20, wherein the broadcast data stored in the broadcast data storage means is MPEG4 format data.

36. A received broadcast data dynamic editing device as claimed in claim 20, wherein the broadcast data stored in the broadcast data storage means is Motion-JPEG format data.

37. A received broadcast data dynamic editing device as claimed in claim 20, wherein the broadcast data stored in the broadcast data storage means includes information concerning time.

38. A received broadcast data dynamic editing device as claimed in claim 20, wherein the broadcast data stored in the broadcast data storage means includes information concerning a channel, recording starting time and recording ending time with respect to the broadcast data.

\* \* \* \* \*